J. J. STORER.

Processes and Apparatus for Deodorizing and Destroying the Gases from Offal-Treating Establishments.

No. 5,703. Reissued Dec. 23, 1873.

WITNESSES;

Oscar F. Perrigo.
Charles M. Nickerson

INVENTOR;

Jason J. Storer.

AM. PHOTO-LITHOGRAPHIC Co. N.Y. (OSBORNE'S PROCESS.)

UNITED STATES PATENT OFFICE.

JACOB J. STORER, OF BOSTON, MASSACHUSETTS.

IMPROVEMENT IN PROCESSES AND APPARATUS FOR DEODORIZING AND DESTROYING THE GASES FROM OFFAL-TREATING ESTABLISHMENTS.

Specification forming part of Letters Patent No. 131,131, dated September 3, 1872; reissue No. 5,703, dated December 23, 1873; application filed December 11, 1873.

*To all whom it may concern:*

Be it known that I, JACOB J. STORER, of Boston, in the county of Suffolk and State of Massachusetts, have invented a new and useful Improvement in Deodorizing Furnaces and Processes, which the following specification and accompanying drawings sufficiently describe.

The object of my invention is to dispose of the refuse animal matter of slaughtering, rendering, bone-boiling, and other like establishments, in such a way that no offensive or noxious odors or gases shall escape into the air. Various attempts have been made to accomplish this object by causing the current of the offensive gases and accompanying steam, which are generated by the heating of the refuse animal matter, to pass back to and through the same heat which generated them; but all such modes of proceeding have proved unsatisfactory in practice, because of the difficulty of maintaining an adequate heat under the refuse animal matter, the heat being constantly damped by the return current of the imperfectly-decomposed gases and steam.

The leading feature of the improved process which I am about to describe will be found to consist in this: That the offensive gases and steam are conducted from the place of their generation to a heat-radiating chamber heated separately or independently of the gas or steam generator, in which chamber they are subjected to such heat as to sufficiently deodorize them before they are allowed to escape into the air.

For the purpose of carrying out my process, I propose to employ the apparatus hereinafter described, which contains in itself some novel features; but the same process may be carried out with more or less perfection by the use of other apparatus than that herein particularly described or represented.

I construct a reverberatory furnace preferably like that patented by James D. Whelpley and Jacob J. Storer in the United States Patent Office, No. 109,785, dated November 29, 1870, and attach it to an auxiliary fire-place.

Figure 1:
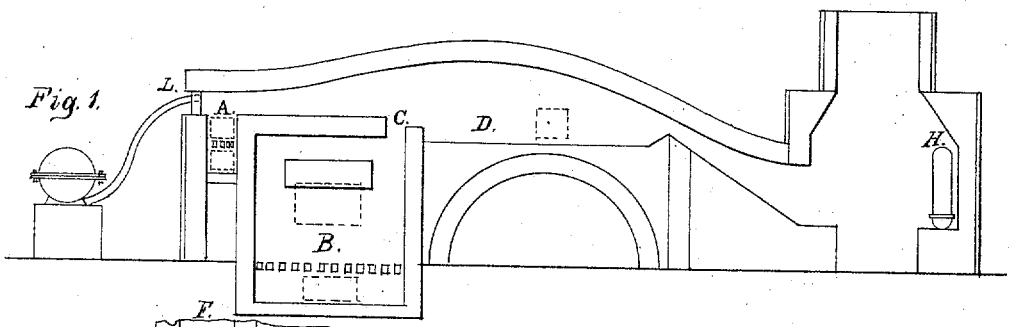
Figure 2:
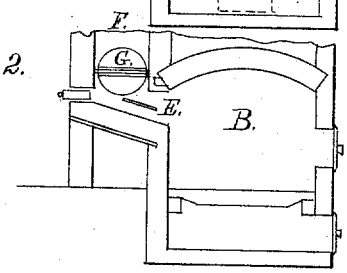

The drawing, Figure 1, shows one form of furnace, which I have used for this purpose.

Fires are built in the auxiliary fire-place A, and in the main fire-place or gas-generator B, and urged until the fire-places and surrounding brick-work have become well heated. Pulverized coal, with air, is then injected by the pulverizer or blower K through the slot or opening L in the rear of the furnace. This jet of pulverized fuel is ignited by the heat from the auxiliary fire-place, and, moving forward, burns in the body of the furnace D, quickly raising it to a high temperature. The refuse animal matter is then introduced upon the fire in the gas-generator B. The steam and gases arising from it as it dries or burns escape by the slot or opening C, and moving forward into the body of the furnace and mingling with the burning gases and powdered coke of the pulverized fuel become deodorized or decomposed, so that the gases passing off through the smoke-stack give no disagreeable odor.

This animal refuse as it comes from the rendering tanks or vats is usually very wet, and has so offensive an odor that it is desirable to introduce it into the furnace with as little manipulation as possible; therefore, I build a drying-slope or feed-port, E, attached to the furnace, into which the material may be conveyed directly through a hopper from the tank. A hopper, F, to hold any desired quantity of this material, may be built above this feed-port or slope, and a damper or slide, G, may be made to regulate the supply to the furnace. The material as it slides or moves down the drying-slope is partially dried by the heat of the generator, but I find it advantageous to force hot air upon it through the hot-air pipes H H, which are heated by the waste heat of the furnace.

Figure 4:
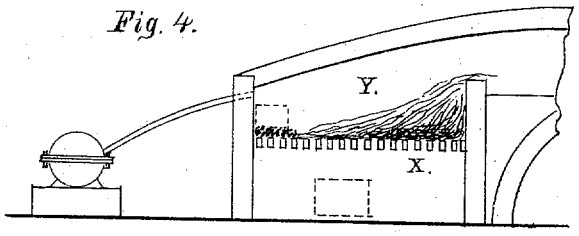
Figure 3:
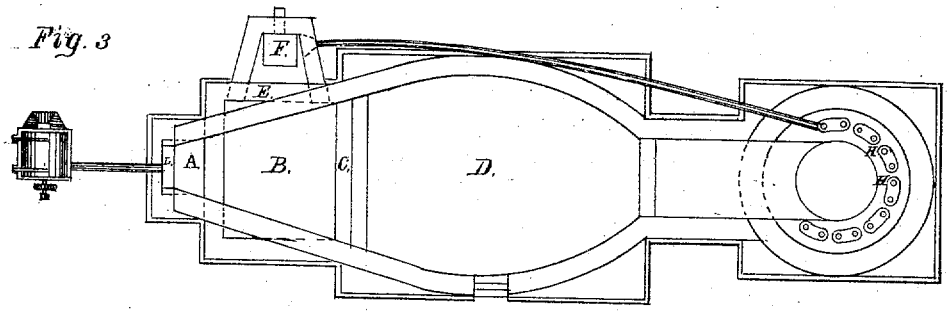

The auxiliary fire-place, though most convenient and suitable, is not necessary to the proper action of the furnace, or success of the process. An ordinary fire-place would serve the same purpose, if a section of it were reserved for the fuel with which to ignite the jet of pulverized fuel, while the rest is devoted to the burning or drying of the animal matter, as shown in Fig. 4, in which X is that part of the grate on which coal or other fuel is burned for the purpose of igniting the jet of pulverized fuel; and Y is that portion intended for the burning or drying of animal matter.

Figure 5:
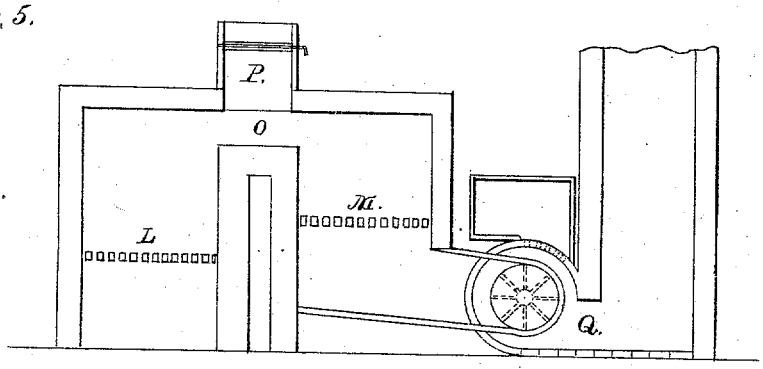

Fig. 5 shows another style of furnace and apparatus, which I have also successfully used to accomplish the desired purpose. Deep coal-fires are made in the two fire-boxes, L and M, and urged in the usual way until they and the connecting-tube O reach a bright-red heat, the smoke and gases from these fires passing off through the opening P. As soon as this furnace has reached a proper temperature the opening at P is closed, and the exhaust and spray-wheel Q (invented and patented in the United States Patent Office, by James D. Whelpley and Jacob J. Storer, No. 53,068, dated March 6, 1866,) put in motion, so that the usual upward draft is maintained in fire-place L, a horizontal draft in the connection O, and a downward draft through the burning coals in fire-place M. The refuse animal matter is then introduced upon the fire in L, which is urged by a blast, and the escaping offensive gases, passing along the heated flue O, and down through burning coals in M, are rendered inodorous and innocuous.

The grate-bars in M are, preferably, made of fire-brick, perforated brick slabs, or iron tubes, with water or air circulating through them; the object being to have a grate that will best endure the intense heat of the downward flame.

The exhaust and spray-wheel may be substituted by a smoke-stack with powerful draft.

To accomplish the desired result, a furnace with two or more fire-places may be used, the animal matter to be burned or dried being placed in one fire-place, and the resulting gases being made to meet and mix with the gases, smoke, and flame arising from the other or others.

When it is desired to dry and not to burn the offensive animal matter, a retort, chamber, or tank of metal or brick, with opening for escape of the gases and steam, is substituted for the fire-place or generator, the escaping steam and gases being deodorized, as herein described, and said retort, chamber, or tank is heated by application of fire to its outer surface, or in any other familiar way.

I am aware that a patent has been granted to R. B. Lockwood, and to C. E. Gray, assignor, for rendering offensive gases inodorous by conducting them from the place of generation through a coil of highly-heated tubes to the auxiliary fire by which the coil is heated, from which fire they escape into the air; and I lay no claim to such a mode of proceeding.

What I claim as my invention, and desire to secure by Letters Patent, is—

1. The modification or improvement of the Whelpley and Storer furnace and apparatus for the application of pulverized fuel, by addition of an auxiliary-fire-place, in the manner and for the purpose substantially as described.

2. A furnace with two fire-places, with a connecting-flue or conductor, one fire-place serving for the burning, drying, or distillation of the material, and the other for the deodorizing of the gases arising therefrom.

3. Deodorizing the offensive gases generated in heating refuse animal matter by passing them through an independently-heated furnace, fire-place, flue, or other heat-radiating chamber, wherein they may be sufficiently deodorized before escaping into the air, substantially in the manner and for the purpose described.

4. The process of deodorizing the gases from offal rendering and drying establishments, by bringing them in contact or mixture with coke, charcoal, or coal, as herein described.

5. In combination with the receptacle in which refuse animal matter is heated, evolving offensive gases or steam, an auxiliary independently-heated radiating-chamber, the whole operating substantially in the manner described, for the purpose described.

JACOB J. STORER.

Witnesses:

N. AUSTIN PARKE,
J. HENRY TAYLOR.